United States Patent
Park et al.

(10) Patent No.: US 11,518,330 B2
(45) Date of Patent: Dec. 6, 2022

(54) VEHICLE ACCIDENT NOTIFICATION DEVICE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Se Young Park, Suwon-si (KR); Jeong Kee Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 8 days.

(21) Appl. No.: 16/746,318

(22) Filed: Jan. 17, 2020

(65) Prior Publication Data
US 2021/0061209 A1 Mar. 4, 2021

(30) Foreign Application Priority Data
Aug. 29, 2019 (KR) .......................... 10-2019-0106759

(51) Int. Cl.
| | |
|---|---|
| *B60R 21/36* | (2011.01) |
| *B60R 21/0136* | (2006.01) |
| *G08B 25/00* | (2006.01) |
| *B60R 21/015* | (2006.01) |
| *G06V 20/58* | (2022.01) |
| *G06V 20/59* | (2022.01) |
| *G06V 20/56* | (2022.01) |
| *G06V 40/10* | (2022.01) |
| *B60R 21/00* | (2006.01) |

(52) U.S. Cl.
CPC .... *B60R 21/0136* (2013.01); *B60R 21/01512* (2014.10); *G06V 20/58* (2022.01); *G06V 20/588* (2022.01); *G06V 20/59* (2022.01); *G06V 40/10* (2022.01); *G08B 25/001* (2013.01); *B60R 2021/0027* (2013.01); *B60R 2021/0032* (2013.01); *B60R 2021/0088* (2013.01)

(58) Field of Classification Search
CPC .......... B60R 21/0136; B60R 21/01512; B60R 2021/0032; B60R 2021/0088; B60R 2021/0027; G06K 9/00798; G06K 9/00832; G06K 9/00362; G06K 9/00805; G08B 25/001
See application file for complete search history.

(56) References Cited

U.S. PATENT DOCUMENTS 5,071,160 A * 12/1991 White .................... B60R 21/02
280/735
5,338,062 A * 8/1994 Kiuchi ................ B60R 21/0132
180/274

(Continued)

*Primary Examiner* — Hai Phan
*Assistant Examiner* — Son M Tang
(74) *Attorney, Agent, or Firm* — Morgan, Lewis & Bockius LLP

(57) ABSTRACT

A vehicle accident notification device includes a processor that determines whether a vehicle accident occurs and a degree of the vehicle accident based on a sensing result of a sensor and vehicle information received from a device of the host vehicle and automatically provides a notification of the vehicle accident, a communicator that communicates with other devices, and a storage storing a collision reference value that is used to determine the degree of the vehicle accident in advance.

19 Claims, 4 Drawing Sheets

(56) References Cited

U.S. PATENT DOCUMENTS

| | | | | |
|---|---|---|---|---|
| 5,629,847 A * | 5/1997 | Shirakawa | B60R 21/0133 | 180/282 |
| 8,044,782 B2 * | 10/2011 | Saban | B60N 2/002 | 340/438 |
| 9,050,930 B2 * | 6/2015 | Walsh | G08G 1/166 | |
| 9,457,754 B1 * | 10/2016 | Christensen | B60Q 1/525 | |
| 9,646,428 B1 * | 5/2017 | Konrardy | B60W 40/09 | |
| 9,845,027 B2 * | 12/2017 | Hashimoto | B60R 21/0134 | |
| 9,950,708 B1 * | 4/2018 | Cullinane | B60W 30/095 | |
| 10,124,757 B1 * | 11/2018 | Kerr | B60Q 7/00 | |
| 2002/0033294 A1 * | 3/2002 | Ishizaki | B60R 21/0136 | 180/274 |
| 2002/0070538 A1 * | 6/2002 | Yasui | B60R 21/01556 | 280/735 |
| 2003/0212475 A1 * | 11/2003 | Yamagishi | G08G 1/205 | 701/1 |
| 2004/0150202 A1 * | 8/2004 | Goto | B60R 21/261 | 280/740 |
| 2008/0043099 A1 * | 2/2008 | Stein | G08G 1/167 | 348/118 |
| 2009/0027188 A1 * | 1/2009 | Saban | B60N 2/002 | 340/439 |
| 2009/0167300 A1 * | 7/2009 | Cech | B60R 21/0136 | 324/239 |
| 2010/0138115 A1 * | 6/2010 | Kageyama | B62D 15/029 | 701/46 |
| 2010/0305858 A1 * | 12/2010 | Richardson | G06K 9/00785 | 701/301 |
| 2011/0282538 A1 * | 11/2011 | Tamura | B60R 21/38 | 701/31.4 |
| 2012/0146766 A1 * | 6/2012 | Geisler | G07C 5/008 | 340/8.1 |
| 2012/0150405 A1 * | 6/2012 | Fukawa | G08G 1/163 | 701/70 |
| 2015/0210280 A1 * | 7/2015 | Agnew | B60W 30/095 | 701/48 |
| 2015/0224956 A1 * | 8/2015 | Takenaka | B60R 21/38 | 73/862.381 |
| 2015/0232018 A1 * | 8/2015 | Augst | G09F 19/18 | 340/468 |
| 2015/0329112 A1 * | 11/2015 | Jeon | B60W 10/20 | 701/41 |
| 2016/0114798 A1 * | 4/2016 | Kim | B60W 30/095 | 701/41 |
| 2016/0144787 A1 * | 5/2016 | Saward | H04N 7/181 | 701/29.1 |
| 2016/0144817 A1 * | 5/2016 | Chambers | G08G 1/205 | 340/436 |
| 2016/0318445 A1 * | 11/2016 | Sugimoto | B60W 60/0027 | |
| 2016/0342850 A1 * | 11/2016 | Elimalech | G08G 1/166 | |
| 2017/0032678 A1 * | 2/2017 | Sim | G08G 1/166 | |
| 2017/0072851 A1 * | 3/2017 | Shenoy | G08G 1/096775 | |
| 2017/0088088 A1 * | 3/2017 | Marable | B60R 21/2338 | |
| 2017/0129442 A1 * | 5/2017 | Choi | B60R 21/214 | |
| 2017/0144597 A1 * | 5/2017 | Wu | B60Q 9/008 | |
| 2017/0225614 A1 * | 8/2017 | Park | G08G 1/16 | |
| 2017/0329332 A1 * | 11/2017 | Pilarski | B60W 30/0956 | |
| 2018/0032082 A1 * | 2/2018 | Shalev-Shwartz | G06N 7/005 | |
| 2018/0137375 A1 * | 5/2018 | Takemura | H04N 5/238 | |
| 2018/0215395 A1 * | 8/2018 | Keany | G06K 9/00221 | |
| 2018/0253595 A1 * | 9/2018 | Aoki | G06T 7/246 | |
| 2018/0253904 A1 * | 9/2018 | Kuwabara | G08G 1/167 | |
| 2018/0339704 A1 * | 11/2018 | Jo | B60W 30/0956 | |
| 2018/0342034 A1 * | 11/2018 | Kislovskiy | G06Q 10/06315 | |
| 2018/0342113 A1 * | 11/2018 | Kislovskiy | G08G 1/202 | |
| 2018/0357772 A1 * | 12/2018 | Takemura | G06K 9/00369 | |
| 2019/0031161 A1 * | 1/2019 | Ji | B60W 10/184 | |
| 2019/0047500 A1 * | 2/2019 | Ghannam | B60R 21/013 | |
| 2019/0084522 A1 * | 3/2019 | Funahashi | B60R 21/0134 | |
| 2019/0098953 A1 * | 4/2019 | Strickland | G06K 9/00805 | |
| 2019/0103017 A1 * | 4/2019 | Ohta | B60Q 1/04 | |
| 2019/0114920 A1 * | 4/2019 | Hilnbrand | G08G 1/162 | |
| 2019/0241139 A1 * | 8/2019 | Kanegae | B60R 21/01512 | |
| 2020/0160994 A1 * | 5/2020 | Iwaasa | G16H 40/67 | |
| 2020/0353887 A1 * | 11/2020 | Zeng | B60R 21/261 | |
| 2020/0374680 A1 * | 11/2020 | D'Addetta | G06F 17/18 | |

* cited by examiner

VEHICLE ACCIDENT NOTIFICATION DEVICE, SYSTEM INCLUDING THE SAME, AND METHOD THEREOF

CROSS-REFERENCE TO RELATED APPLICATION

The present application claims priority to and the benefit of Korean Patent Application No. 10-2019-0106759, filed on Aug. 29, 2019, which is incorporated herein by reference in its entirety.

TECHNICAL FIELD

The present disclosure relates to a vehicle accident notification device, a system including the same, and a method thereof, and more particularly, relates to technologies of determining seriousness of a traffic accident and providing a notification of the accident.

BACKGROUND

The statements in this section merely provide background information related to the present disclosure and may not constitute prior art.

A vehicle accident notification service (e.g., eCALL) of automatically making a call to the 119 center, the hospital, or the like in the event of a traffic accident to provide a notification of the accident has been provided.

Such a vehicle accident notification service may be provided by airbag deployment or button manipulation by a user. It is difficult to determine the seriousness of a traffic accident using only airbag deployment.

In other words, upon a real-end collision, when a host vehicle collides with a pedestrian or a two-wheeled vehicle, because the host vehicle has a relatively slighter damage than a target (e.g., a pedestrian, a two-wheeled vehicle, a vehicle behind the host vehicle, or the like) and because an airbag of the host vehicle is not deployed, the vehicle accident notification service is not enabled.

However, because casualties frequently occur although an airbag is not deployed in the event of a real accident, it is difficult to quickly rescue and treat the casualties due to the delay of the notification of a vehicle accident.

Furthermore, there is a limitation that the vehicle accident notification service proceeds to a next process through only a counselor and is provided in only some areas.

SUMMARY

An aspect of the present disclosure provides a vehicle accident notification device for determining seriousness of a traffic accident based on vehicle sensing information and vehicle information and automatically providing a notification of the accident quickly and accurately, a system including the same, and a method thereof.

According to an aspect of the present disclosure, a vehicle accident notification device may include: a processor that determines whether a vehicle accident occurs and seriousness of the vehicle accident based on a sensing result of a sensing device of a host vehicle and vehicle information received from a device in the host vehicle and automatically provides a notification of the vehicle accident, a communicator that performs communication for providing the notification of the vehicle accident with the outside of the host vehicle, and a storage storing an impact amount reference value causing the processor to determine the seriousness of the vehicle accident in advance. The processor may determine a type of an accident target with the host vehicle, when an impact occurs, and may differently set a degree for determining the seriousness of the vehicle accident, depending on the type of the accident target.

In some forms of the present disclosure, the processor may determine whether the impact occurs due to an accident between the host vehicle and a surrounding vehicle or an accident between the host vehicle and a pedestrian or a two-wheeled vehicle, when the impact occurs.

In some forms of the present disclosure, the processor may determine whether to automatically provide the notification of the vehicle accident, depending on a magnitude of an amount of the impact, when the impact occurs due to the accident between the host vehicle and the surrounding vehicle.

In some forms of the present disclosure, the processor may attempt to make a call to 112 or 119 to automatically provide the notification of the vehicle accident.

In some forms of the present disclosure, the vehicle accident notification device may further include a display that displays a screen for automatically providing the notification of the vehicle accident and receives an input for stopping automatically providing the notification of the vehicle accident from a user.

In some forms of the present disclosure, the processor may identify whether the pedestrian or a person who rides in the two-wheeled vehicle is an adult or an infant, when the impact occurs due to the accident between the host vehicle and the pedestrian or the two-wheeled vehicle.

In some forms of the present disclosure, the processor may automatically provide the notification of the vehicle accident, when the pedestrian or the person who rides in the two-wheeled vehicle is the infant.

In some forms of the present disclosure, the processor may determine whether to automatically provide the notification of the vehicle accident depending on a magnitude of an amount of the impact, when the pedestrian or the person who rides in the two-wheeled vehicle is the adult.

In some forms of the present disclosure, the processor may differently set the impact amount reference value depending on at least one or more of a passenger riding position, a collision direction, and/or a collision target of the host vehicle.

In some forms of the present disclosure, the processor may set the impact amount reference value when the collision target is a person to be lower than an impact amount reference value when the collision target is a vehicle.

In some forms of the present disclosure, the processor may set the impact amount reference value when the passenger riding position of the host vehicle is identical to the collision direction to be lower than an impact amount reference value when the passenger riding position of the host vehicle is not identical to the collision direction.

In some forms of the present disclosure, the processor may automatically provide the notification of the vehicle accident, when the host vehicle changes its location to an area except for a road, departs from a lane, or crosses a centerline.

According to another aspect of the present disclosure, a vehicle system may include: a sensing device that senses an object around a host vehicle and an amount of impact and a vehicle accident notification device that determines whether a vehicle accident occurs and seriousness of the vehicle accident based on a sensing result of the sensing device and vehicle information received from a device in the host vehicle and automatically provides a notification of the vehicle accident. The vehicle accident notification device may determine a type of an accident target with the host vehicle, when an impact occurs, and may differently set a degree for determining the seriousness of the vehicle accident depending on the type of the accident target.

In some forms of the present disclosure, the sensing device may include a front and rear view camera that captures an image of the object around the host vehicle, a G sensor that senses an amount of an impact, when the impact occurs, and a radar and a light detection and ranging (LiDAR) that senses a location, a relative distance, and an approaching speed of the object around the host vehicle.

In some forms of the present disclosure, the vehicle system may further include a global positioning system (GPS) receiver that receives location information of the host vehicle.

According to another aspect of the present disclosure, a vehicle accident notification method may include: determining whether a vehicle accident occurs based on a sensing result of a sensing device of a host vehicle and vehicle information received from a device in the host vehicle, determining a type of an accident target with the host vehicle, when the vehicle accident occurs, determining seriousness of the vehicle accident depending on the type of the accident target, and automatically providing a notification of the vehicle accident depending on the seriousness of the vehicle accident.

In some forms of the present disclosure, the vehicle accident notification method may further include displaying a screen for automatically providing the notification of the vehicle accident, when automatically providing the notification of the vehicle accident and receiving an input for stopping automatically providing the notification of the vehicle accident from a user.

In some forms of the present disclosure, the vehicle accident notification method may further include automatically providing the notification of the vehicle accident when the host vehicle changes its location to an area except for a road, departs from a lane, or crosses a centerline, although an impact of the host vehicle is not detected.

In some forms of the present disclosure, the determining of the type of the accident target with the host vehicle may include determining whether an impact occurs due to an accident between the host vehicle and a surrounding vehicle or an accident between the host vehicle and a pedestrian or a two-wheeled vehicle, when the impact occurs and identifying whether the pedestrian or a person who rides in the two-wheeled vehicle is an adult or an infant, when the impact occurs due to the accident between the host vehicle and the pedestrian or the two-wheeled vehicle. The determining of the seriousness of the vehicle accident may include determining the seriousness of the vehicle accident depending on a magnitude of an amount of the impact, when the impact occurs due to the accident between the host vehicle and the surrounding vehicle and determining the seriousness of the vehicle accident depending on a magnitude of an amount of the impact, when the pedestrian or the person who rides in the two-wheeled vehicle is the adult.

In some forms of the present disclosure, the determining of the seriousness of the vehicle accident depending on the magnitude of the amount of the impact may include differently setting an impact amount reference value depending on at least one or more of a passenger riding position, a collision direction, and/or a collision target of the host vehicle and comparing the amount of the impact with the impact amount reference value to determine the seriousness of the vehicle accident.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
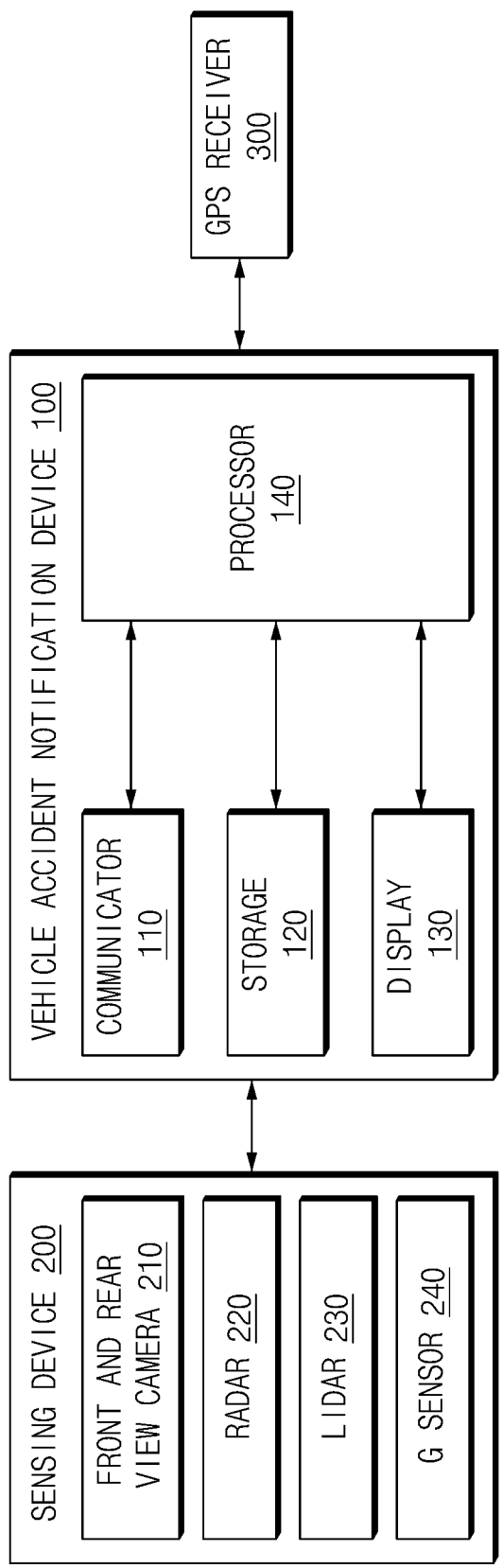
FIG. 1 is a block diagram illustrating a configuration of a vehicle system including a vehicle accident notification device in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Some forms of the present disclosure relate to a vehicle accident notification service (e.g., eCALL) and disclose technologies of automatically providing a vehicle accident notification service using vehicle information and sensing information rather than airbag deployment or a user request (a button input).

Hereinafter, a description will be given in some forms of the present disclosure with reference to FIGS. 1 and 4.

FIG. 1 is a block diagram illustrating a configuration of a vehicle system including a vehicle accident notification device in some forms of the present disclosure.

Referring to FIG. 1, a vehicle accident notification device 100 in some forms of the present disclosure may determine seriousness of a traffic accident through interworking with a sensing device 200 and a global positioning system (GPS) receiver 300 and may automatically provide a notification of a vehicle accident depending on the seriousness of the traffic accident.

The vehicle accident notification device 100 may determine whether a vehicle accident occurs and the seriousness of the vehicle accident based on information (e.g., information about an object outside a host vehicle, an amount of impact, or the like) received from the sensing device 200 and vehicle information (e.g., a vehicle speed signal, vehicle location information, or the like) received through controller area network (CAN) communication from a device in the host vehicle and may automatically provide a notification of the vehicle accident. In this case, when an impact occurs, the vehicle accident notification device 100 may determine a type (e.g., a vehicle, a pedestrian, a two-wheeled vehicle, or the like) of an accident target with the host vehicle and may differently set a degree for determining the seriousness of the vehicle accident depending on the type of the accident target.

The vehicle accident notification device 100 may include a communicator 110, a storage 120, a display 130, and a processor 140.

The communicator 110 may be a hardware device implemented with various electronic circuits to transmit and receive a signal through a wireless or wired connection. In some forms of the present disclosure, the communicator 110 may perform inter-vehicle communication through controller area network (CAN) communication, local interconnect network (LIN) communication, Ethernet communication, or the like and may include various communication units, for example, a mobile communication unit, a broadcast receiving unit, such as a digital multimedia broadcasting (DMB) module or a digital video broadcasting-handheld (DVB-H) module, a short-range communication unit, such as a ZigBee module or a near field communication (NFC) module which is a Bluetooth module, and a wireless-fidelity (Wi-Fi) unit, for communication with an emergency center, an accident center, a 119 fire department, a police station, or the like outside the host vehicle.

The storage 120 may store a sensing result of the sensing device 200 and an impact amount reference value or the like for determining seriousness of a vehicle accident at the processor 140. In this case, the impact amount reference value may be set in advance by an experimental value and may be differently set according to at least one or more of a passenger riding position, a collision direction, and/or a collision target of the host vehicle.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 130 may be controlled by the processor 140 to display a screen when making a call for an accident notification and receive an input for stopping making a call from a user. In this case, the screen for stopping making a call may be output in the form of a pop-up.

The display 130 may be implemented as a head-up display (HUD), a cluster, an audio video navigation (AVN), or the like. Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and/or a three-dimensional (3D) display. Some thereof may be implemented as transparent displays configured as a transparent type or a semi-transparent type to see the outside. Moreover, the display 130 may be implemented as a touchscreen including a touch panel to be used as an input device other than an output device.

The processor 140 may be electrically connected with the communicator 110, the storage 120, the display 130, or the like and may electrically control the respective components. The processor 140 may be an electrical circuit which executes instructions of software and may perform a variety of data processing and calculation described below.

When an impact occurs, the processor 140 may determine whether the impact occurs due to an accident between a host vehicle and a surrounding vehicle or an accident between the host vehicle and a pedestrian or two-wheeled vehicle.

When the impact occurs due to the accident between the host vehicle and the surrounding vehicle, the processor 140 may determine whether to automatically provide a notification of the vehicle accident depending on a magnitude of the amount of the impact and may attempt to make a call to 112 or 119 to automatically provide the notification of the vehicle accident.

When the impact occurs due to the accident between the host vehicle and the pedestrian or two-wheeled vehicle, the processor 140 may identify whether the pedestrian or a person who rides in the two-wheeled vehicle is an adult or an infant. When the pedestrian or the person who rides in the two-wheeled vehicle is the infant, the processor 140 automatically should provide the notification of the vehicle accident.

On the other hand, when the pedestrian or the person who rides in the two-wheeled vehicle is the adult, the processor 140 may determine whether to automatically provide the notification of the vehicle accident depending on a magnitude of the amount of the impact.

The processor 140 may differently set an impact amount reference value depending on at least one or more of a passenger riding position, a collision direction, and/or a collision target of the host vehicle.

The processor 140 may set the impact amount reference value when the collision target is a person to be lower than an impact amount reference value when the collision target is a vehicle.

The processor 140 may set the impact amount reference value when the passenger riding position of the host vehicle is identical to the collision direction to be lower than an impact amount reference value when the passenger riding position of the host vehicle is not identical to the collision direction.

When the host vehicle changes its location to an area except for the road, departs from a lane, or crosses the centerline, the processor 140 may automatically provide the notification of the vehicle accident.

The sensing device 200 may include a plurality of sensors for sensing an object outside the host vehicle and may obtain information about a location of the object outside the host vehicle, a speed of the object outside the host vehicle, a movement direction of the object outside the host vehicle, and/or a type (e.g., a vehicle, a pedestrian, a two-wheeled vehicle (a bicycle or a motorcycle)) of the object outside the host vehicle. The sensing device 200 may provide the result of sensing the object outside the host vehicle to the vehicle accident notification device 100. The vehicle accident notification device 100 may identify whether the object outside the host vehicle is a vehicle or a two-wheeled vehicle based on the information received from the sensing device 200. When the object outside the host vehicle is a pedestrian, the vehicle accident notification device 100 may identify whether the pedestrian is an adult or an infant.

To this end, the sensing device 200 may include a forward and rear view camera 210, a radar 220, a light detection and ranging (LiDAR) 230, a G sensor 240, or the like.

The forward and rear view camera 210 may include at least one or more cameras and may be loaded into the front, both sides, and the rear of the host vehicle to capture the front, the both sides, and the rear of the host vehicle and provide the captured images to the vehicle accident notification device 100. Thus, the vehicle accident notification device 100 may recognize a surrounding vehicle and a pedestrian based on image data received from the front and rear view camera 210. In this case, the vehicle accident notification device 100 may recognize whether the pedestrian is an adult or an infant. In this case, the forward and rear view camera 210 may include a drive video record system (DVRS) front view camera (FHD) and a surround view monitor (SVM) front and rear view camera (HD). The number of cameras included in the forward and rear view camera 210 may be changed according to vehicle specifications. The forward and rear view camera 210 may include two or more cameras.

The radar 220 and the LiDAR 230 may be loaded into the front, both sides, and the rear of the host vehicle to detect a location of an external object which exists in front of, at both sides, and behind the host vehicle, a distance from the external object, whether the external object approaches the host vehicle, and the like and provide the detected information to the vehicle accident notification device 100.

The G sensor 240 may sense an amount of impact of the host vehicle and may provide the sensed information to the vehicle accident notification device 100. The G sensor 240 may calculate an amount of impact and an impact direction on X-, Y-, and Z-axes and may detect whether the host vehicle overturns.

Furthermore, the sensing device 200 may further include an ultrasonic sensor, a laser scanner and/or a corner radar, an acceleration sensor, a yaw rate sensor, a torque sensor and/or a wheel speed sensor, a steering angle sensor, or the like to enhance the accuracy of detecting an external object.

The GPS receiver 300 may receive GPS information and may provide the received GPS information to the vehicle accident notification device 100. In this case, the GPS information may include location information of the host vehicle.

As such, some forms of the present disclosure may determine the seriousness of a traffic accident using vehicle information received through the front and rear view camera 210, the radar 220, the LiDAR 230, the G sensor 240, the GPS receiver 300, and vehicle CAN communication and may quickly and accurately provide an accident notification service.

Figure 2:
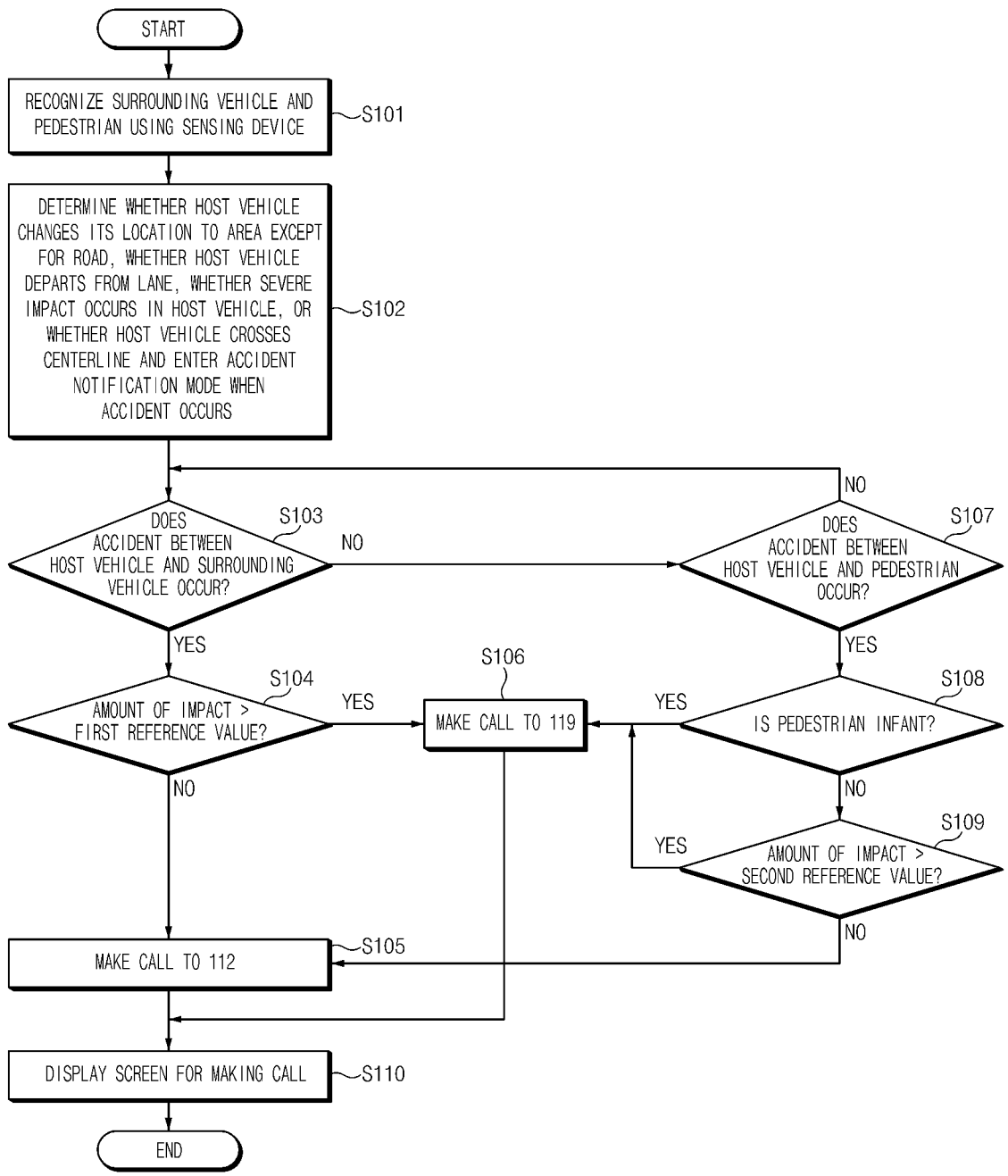
FIG. 2 is a flowchart illustrating a vehicle accident notification method in one form of the present disclosure.

Hereinafter, a description will be given in detail of a vehicle accident notification method in some forms of the present disclosure. FIG. 2 is a flowchart illustrating a vehicle accident notification method in some forms of the present disclosure.

Hereinafter, it is assumed that a vehicle accident notification device 100 of FIG. 1 performs a process of FIG. 2. Furthermore, in a description of FIG. 2, an operation described as being performed by an apparatus may be understood as being controlled by a processor 140 of the vehicle accident notification device 100

In S101, the apparatus may recognize a surrounding vehicle and a pedestrian based on a sensing device 200 of FIG. 1. The apparatus may determine whether an object around a host vehicle is a vehicle, a pedestrian, or a two-wheeled vehicle based on image data received from a front and rear view camera 210 of FIG. 1 and may determine whether the pedestrian is an adult or an infant.

When the host vehicle is traveling based on a vehicle speed signal, the apparatus may determine whether the host vehicle changes its location to an area except for the road, whether the host vehicle departs from a lane, whether a severe impact occurs in the host vehicle, or whether the host vehicle crosses the centerline, based on a sensing result of the sensing device 200 and vehicle information (e.g., a vehicle speed signal or the like) received from controllers in the host vehicle and may determine whether an accident occurs from the determined result. When it is determined that the accident occurs, in S102, the apparatus may enter an accident notification mode. In this case, the apparatus may determine whether the host vehicle changes its location to an area except for the road, departs from a lane, or crosses the centerline, based on GPS information received from a GPS receiver 300 of FIG. 1 and may determine whether an impact occurs in the host vehicle using a G sensor 240 of FIG. 1. Furthermore, when an amount of impact is not received from the G sensor 240 due to a specific reason, the apparatus may ascertain a location of the host vehicle using the front and rear view camera 210 and the GPS receiver 300 and may recognize a severe impact where the host vehicle departs from a lane or an accident where the host vehicle crosses the centerline. In this case, that the host vehicle changes its location to the area except for the road may include that the host vehicle departs from the road due to an unpredictable reason such as inexperienced driving or a natural disaster, except the host vehicle is close to a shoulder, for example, that the host vehicle parks on the shoulder. Particularly, because vehicles easily approach the seashore or riverside in Korea, but because the seashore or riverside lacks safety facilities such as a barrier, a guiderail, and a night lighting device, when there occurs an accident in which a user sinks in deep water, because the user becomes fatal, the apparatus may detect that the host vehicle changes its location to an area except for the road although a collision does not occur and may determine whether to provide a notification of the accident.

In S103, the apparatus may determine whether there occurs an accident between the host vehicle and a surrounding vehicle. When there occurs the accident between the host vehicle and the surrounding vehicle, in S104, the apparatus may determine whether an amount of impact measured by the G sensor 240 is greater than a predetermined first reference value. In this case, the first reference value may be preset by an experimental value.

When the amount of impact is less than or equal to the first reference value, in S105, the apparatus may determine that a current situation is not an emergency situation to make a call to 112. On the other hand, when the amount of impact is greater than the first reference value, in S106, the apparatus may determine that the current situation is the emergency situation to make a call to 119. In this case, the emergency situation refers to existence of an emergency patient. In other words, because there is an emergency patient in the emergency situation, the apparatus may make a call to 119 and calls for an ambulance. When it is determined that there is no emergency patient, the apparatus may make a call to 112 and may report an accident.

When attempting to make a call to 112 or 119 in S105 and S106, in S110, the apparatus may display a screen for making a call on a display 130 of FIG. 1 and may receive an input for stopping making a call from the user. In this case, the screen for making a call may be displayed in the form of a pop-up on the display 130 such as a cluster or an AVN. The apparatus may disable a function of displaying the screen for making a call if unnecessary. Furthermore, although the amount of impact is less than or equal to the first reference value, the apparatus may display a pop-up screen for querying the user whether to make a call to 119.

Meanwhile, when it is determined that the accident between the host vehicle and the surrounding vehicle does not occur, in S107, the apparatus may determine whether there occurs an accident between the host vehicle and a pedestrian (or a two-wheeled vehicle).

When it is determined that there occurs the accident between the host vehicle and the pedestrian (or the two-wheeled vehicle), in S108, the apparatus may determine whether the pedestrian or a person who rides in the two-wheeled vehicle is an adult or an infant. In this case, the apparatus may determine whether the pedestrian or the person who rides in the two-wheeled vehicle is the adult or the infant, based on image data by the front and rear view camera 210.

When the pedestrian is the adult, in S109, the apparatus may determine whether the amount of impact is greater than a second reference value. When the amount of impact is greater than the second reference value, in S106, the apparatus may determine a current situation as an emergency situation and may make a call to 119. On the other hand, when the amount of impact is less than or equal to the second reference value, in S105, the apparatus may determine that the current situation is not the emergency situation and may make a call to 112.

When attempting to make a call to 112 or 119, in S110, the apparatus may display a screen for making a call on the display 130 and may receive an input for stopping making a call from the user.

As such, when there occurs an accident of collision between the host vehicle and a surrounding vehicle, the vehicle accident notification device 100 in some forms of the present disclosure may determine whether to make a call to 119 or 112 depending on an amount of impact. Furthermore, when there occurs an accident of collision between the host vehicle and an infant, the vehicle accident notification device 100 should make a call to 119 and should provide a notification of the accident. When there occurs an accident of collision between the host vehicle and an adult, the vehicle accident notification device 100 may determine whether to make a call to 119 or 112 depending on an amount of impact.

In other words, the vehicle accident notification device 100 in some forms of the present disclosure may automatically provide a notification of the accident and may automatically call for an ambulance, depending on a target to whom the accident occurred and an amount of impact.

In FIG. 2, the vehicle accident notification device 100 makes a call to 119 or 112 depending on the target to whom the accident occurred and the amount of impact. However, other forms of the present disclosure may be available. For example, the vehicle accident notification device 100 may automatically provide a notification of an accident or may fail to provide the notification of the accident, depending on a target to whom the accident occurred and an amount of impact.

Figure 3:
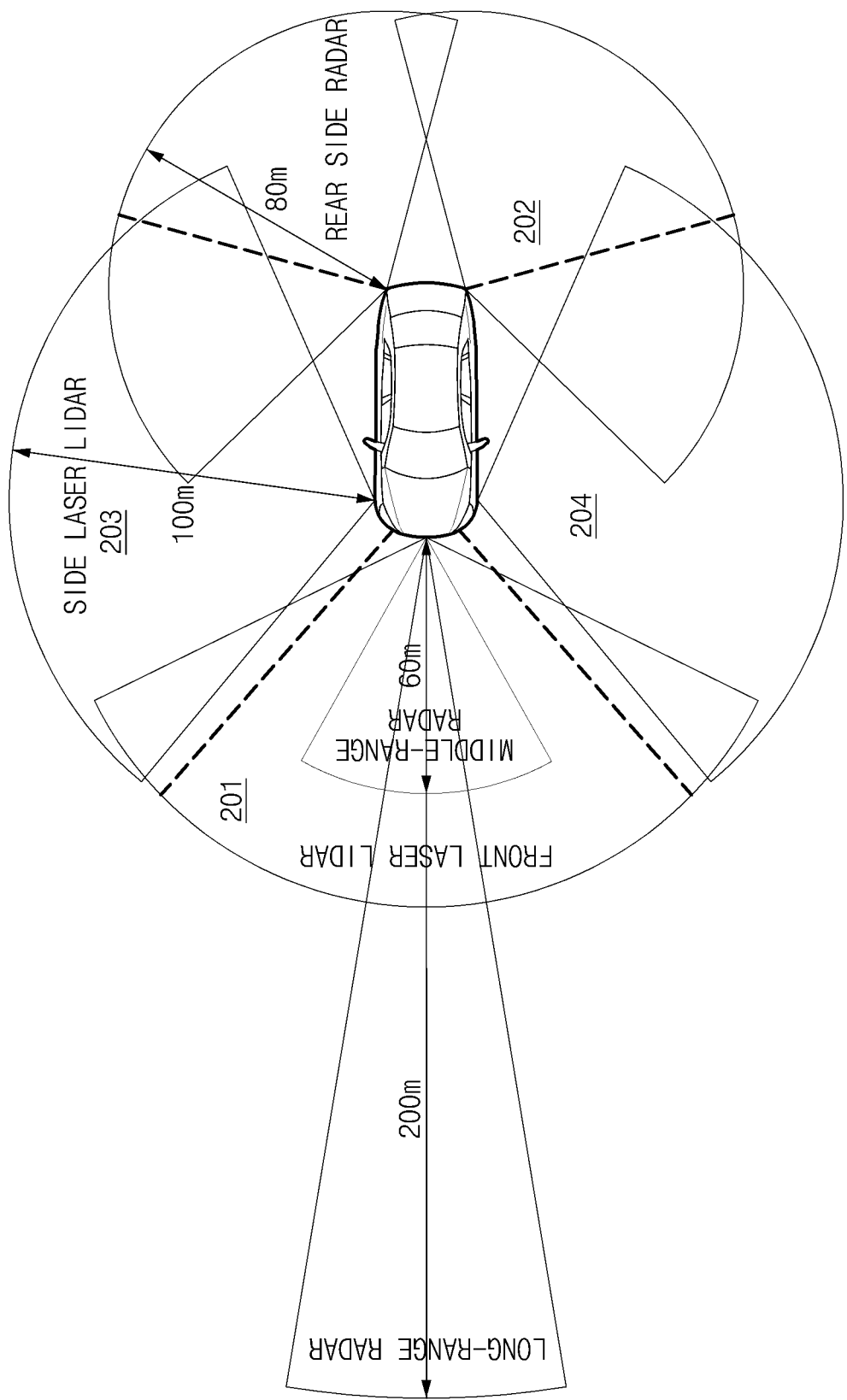
FIG. 3 is a drawing illustrating classifying an impact reference for each area around a vehicle according to a sensing range of a sensing device in one form of the present disclosure.

FIG. 3 is a drawing illustrating classifying an impact reference for each area around a vehicle according to a sensing range of a sensing device in some forms of the present disclosure.

Referring to FIG. 3, because a vehicle accident notification device 100 in some forms of the present disclosure recognizes a location of a target vehicle before an impact using a radar 220 and a LiDAR 230 of FIG. 1, it may differentiate a corresponding method with regard to an influence on a passenger seat depending on a collision point and direction although receiving the same amount of impact.

For example, when a host vehicle collides with the target vehicle, the vehicle accident notification device 100 may divide an area which may inflict a direct injury on a passenger seat and may divide and operate an impact reference. For example, in a state where a passenger sits in only the driver's seat, the vehicle accident notification device 100 may set an impact amount reference value of an area 201 in front of the host vehicle to 2, may set an impact amount reference value of an area 202 behind the host vehicle to 5, and may set each of impact amount reference values of areas 203 and 204 at both sides of the host vehicle to 4.

When a collision occurs in the area 201 in front of the host vehicle in the state where the passenger sits in only the driver's seat, the vehicle accident notification device 100 may determine a current situation as an emergency situation when an amount of impact is greater than 2. When an amount of impact of a collision in the area 201 in front of the host vehicle is less than or equal to 2, when an amount of impact of a collision in the area 202 behind the host vehicle is less than or equal to 4, or when an amount of impact of a collision in the areas at both the sides of the host vehicle is less than or equal to 5, the vehicle accident notification device 100 may determine that the current situation is not the emergency situation and may fail to automatically provide a notification of the accident.

For example, in a state where passengers sit in the driver's seat and a front passenger seat, the vehicle accident notification device 100 may set impact amount reference values of the area 201 in front of the host vehicle and the area 203 at the right of the host vehicle to be lower than impact amount reference values of the area 202 behind the host vehicle and the area 204 at the left of the host vehicle.

Furthermore, when passengers sit in the driver's seat and a left rear passenger seat, the vehicle accident notification device 100 may set impact amount reference values of the area 201 in front of the host vehicle and the area 204 at the left of the host vehicle to be lower than impact amount reference values of the area 202 behind the host vehicle and the area 203 at the right of the host vehicle.

As such, without adding separate hardware for a separate accident notification and irrespective of airbag deployment, some forms of the present disclosure may determine whether there occurs an accident using vehicle information received through a sensing device previously loaded into the host vehicle and CAN communication in the host vehicle and may provide an accident notification service. Moreover, some forms of the present disclosure may provide a notification of the accident to take care of a pedestrian outside the host vehicle, a passenger which rides in a two-wheeled vehicle, or the like as well as the driver in the host vehicle.

Furthermore, some forms of the present disclosure may differently set an impact amount reference value for providing an accident notification service depending on an amount of impact or a type (a vehicle, a pedestrian, a two-wheeled vehicle, or the like) of an external object. Although a collision with the external object does not occur, the vehicle accident notification device 100 may recognize a location of the host vehicle, may determine whether the host vehicle departs from the road or whether the host vehicle crosses the centerline, and may provide an accident notification service. Moreover, some forms of the present disclosure may differently set an impact amount reference value depending on a location in which the passenger rides in the host vehicle and a collision location (direction) and may determine an emergency situation degree of the passenger for an omnidirectional collision.

Figure 4:
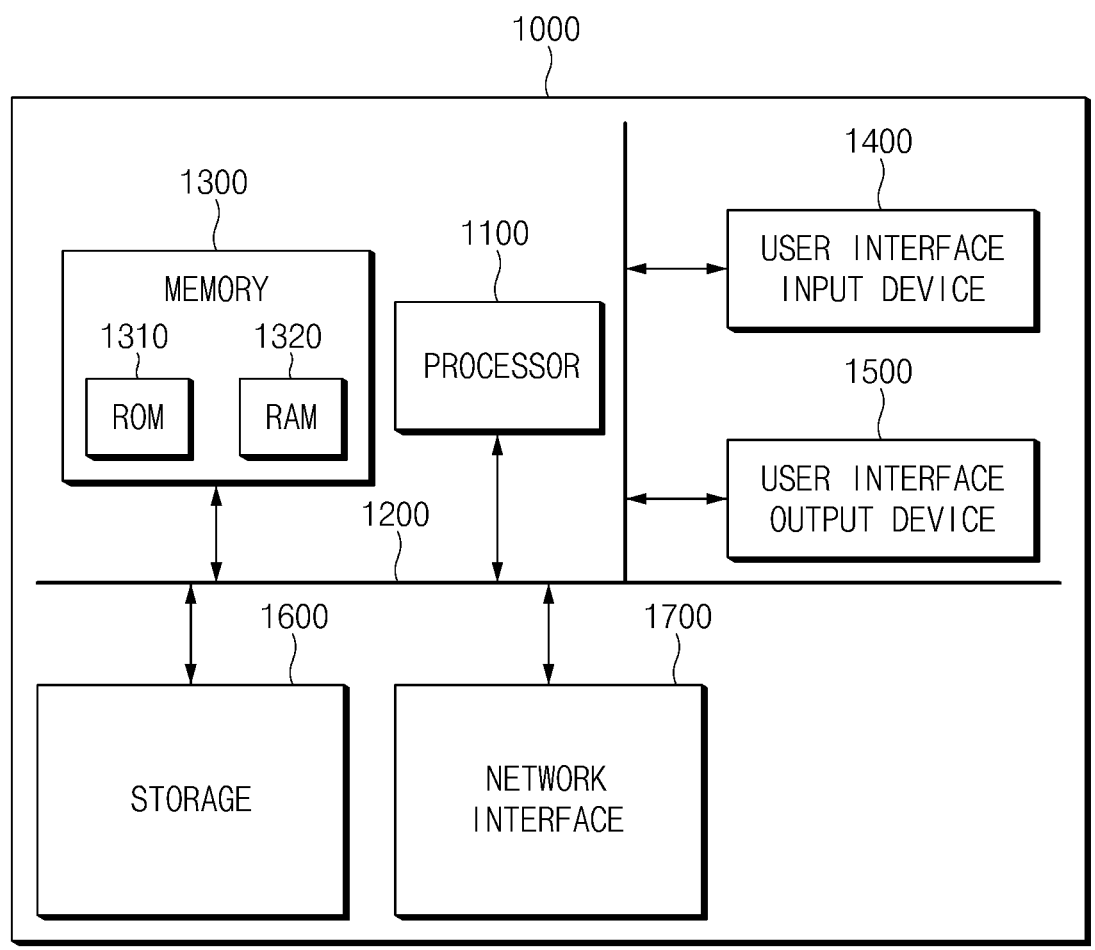
FIG. 4 is a block diagram illustrating a computing system in one form of the present disclosure.

FIG. 4 is a block diagram illustrating a computing system in some forms of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm in some forms of the present disclosure may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may determine the seriousness of a traffic accident based on vehicle sensing information and vehicle information and may automatically provide a notification of the accident quickly and accurately, thus preventing an automatic notification service from being disabled as the airbag is not deployed and quickly rescuing casualties.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle accident notification device, comprising:
    a processor configured to determine whether a vehicle accident occurs and a degree of the vehicle accident based on a sensing result of a sensor of a host vehicle and vehicle information received from a device of the host vehicle;
    a communicator configured to communicate with other devices; and
    a storage configured to store a collision reference value that is used to determine the degree of the vehicle accident in advance,
    wherein the processor is further configured to:
        differently set, according to a type of the vehicle accident, a collision reference for a notification of the vehicle accident;
        determine a type of an accident when a collision with the host vehicle occurs;
        determine the degree of the vehicle accident depending on the type of the accident;
        automatically provide a notification of the vehicle accident depending on the collision reference and the degree of the vehicle accident, although an airbag is not deployed in the vehicle accident; and
        set the collision reference value using a passenger riding position, a collision direction, and a collision target of the host vehicle.

2. The vehicle accident notification device of claim 1, wherein the processor is configured to:
    determine whether the collision is between the host vehicle and a surrounding vehicle, between the host vehicle and a pedestrian, or between the host vehicle and a two-wheeled vehicle when the collision occurs.

3. The vehicle accident notification device of claim 2, wherein the processor is configured to:
    determine whether to automatically provide the notification of the vehicle accident depending on a magnitude of the collision when the collision is between the host vehicle and the surrounding vehicle.

4. The vehicle accident notification device of claim 2, wherein the processor is configured to:
    identify whether the pedestrian or a person who rides in the two-wheeled vehicle is an adult or an infant when the collision is between the host vehicle and the pedestrian or between the host vehicle and the two-wheeled vehicle.

5. The vehicle accident notification device of claim 4, wherein the processor is configured to:
    automatically provide the notification of the vehicle accident when the pedestrian or the person who rides in the two-wheeled vehicle is the infant.

6. The vehicle accident notification device of claim 4, wherein the processor is configured to:
    determine whether to automatically provide the notification of the vehicle accident depending on a magnitude of the collision when the pedestrian or the person who rides in the two-wheeled vehicle is the adult.

7. The vehicle accident notification device of claim 1, wherein the processor is configured to:
    make an emergency call to automatically provide the notification of the vehicle accident.

8. The vehicle accident notification device of claim 1, wherein the device further comprises:
    a display configured to:
        display a screen for automatically providing the notification of the vehicle accident; and receive, from a user, an input for stopping automatically providing the notification of the vehicle accident.

9. The vehicle accident notification device of claim 1, wherein, when the collision target is a person, the processor is configured to:
set the collision reference value lower than a collision reference value of when the collision target is a vehicle.

10. The vehicle accident notification device of claim 1, wherein, when the passenger riding position of the host vehicle is identical to the collision direction, the processor is configured to:
set the collision reference value lower than a collision reference value of when the passenger riding position of the host vehicle is not identical to the collision direction.

11. The vehicle accident notification device of claim 1, wherein the processor is configured to:
automatically provide the notification of the vehicle accident when the host vehicle drives on an area other than a road, departs from a lane, or crosses a centerline.

12. A vehicle system, comprising:
a sensor configured to sense an object around a host vehicle and a degree of collision; and
a vehicle accident notification device configured to:
determine whether a vehicle accident occurs and a degree of the vehicle accident based on a sensing result of the sensor and vehicle information received from a device of the host vehicle; and
automatically provide a notification of the vehicle accident,
wherein the vehicle accident notification device is further configured to:
differently set, according to a type of the vehicle accident, a collision reference for a notification of the vehicle accident;
determine a type of an accident when the collision with the host vehicle occurs;
determine the degree of the vehicle accident depending on the type of the accident;
automatically provide a notification of the vehicle accident depending on the collision reference and the degree of the vehicle accident, although an airbag is not deployed in the vehicle accident; and
set a collision reference value using a passenger riding position, a collision direction, and a collision target of the host vehicle.

13. The vehicle system of claim 12, wherein the sensor further comprises:
a camera configured to capture an image of the object around the host vehicle;
a G sensor configured to sense the degree of the collision when the collision occurs; and
a radar and a light detection and ranging (LiDAR) configured to sense a location, a relative distance, and an approaching speed of the object around the host vehicle.

14. The vehicle system of claim 12, wherein the system further comprises:
a global positioning system (GPS) receiver configured to receive location information of the host vehicle.

15. A vehicle accident notification method, comprising:
differently setting according to a type of a vehicle accident, a collision reference for a notification of the vehicle accident;
determining whether the vehicle accident occurs based on a sensing result of a sensor of a host vehicle and vehicle information received from a device of the host vehicle;
determining a type of an accident when the vehicle accident occurs;
determining a degree of the vehicle accident depending on the type of the accident;
automatically providing a notification of the vehicle accident depending on the collision reference and the degree of the vehicle accident, although an airbag is not deployed in the vehicle accident; and
setting a collision reference value using a passenger riding position, a collision direction, and a collision target of the host vehicle.

16. The vehicle accident notification method of claim 15, wherein the method further comprises:
when the notification of the vehicle accident is automatically provided, displaying a screen for automatically providing the notification of the vehicle accident; and
receiving, from a user, an input for stopping automatically providing the notification of the vehicle accident.

17. The vehicle accident notification method of claim 15, wherein the method further comprises:
when the host vehicle drives on an area other than a road, departs from a lane, or crosses a centerline, automatically providing the notification of the vehicle accident.

18. The vehicle accident notification method of claim 15, wherein determining the type of the accident further comprises:
when the collision occurs, determining whether the collision is between the host vehicle and a surrounding vehicle, between the host vehicle and a pedestrian, or between the host vehicle and a two-wheeled vehicle; and
when the collision is between the host vehicle and the pedestrian or between the host vehicle and the two-wheeled vehicle, identifying whether the pedestrian or a person who rides in the two-wheeled vehicle is an adult or an infant,
wherein determining the degree of the vehicle accident further comprises:
when the collision is between the host vehicle and the surrounding vehicle, determining the degree of the vehicle accident depending on a magnitude of the collision; and
when the pedestrian or the person who rides in the two-wheeled vehicle is the adult, determining the degree of the vehicle accident depending on the magnitude of the collision.

19. The vehicle accident notification method of claim 18, wherein determining the degree of the vehicle accident further comprises:
comparing the collision with the collision reference value to determine the degree of the vehicle accident.

* * * * *